(12) United States Patent
Aikawa et al.

(10) Patent No.: US 10,125,803 B2
(45) Date of Patent: Nov. 13, 2018

(54) FIXING DEVICE FOR LOWER LEVEL MEMBER AND FLUID CONTROL APPARATUS PROVIDED WITH THE SAME

(71) Applicant: FUJIKIN INCORPORATED, Osaka-shi (JP)

(72) Inventors: Kenji Aikawa, Osaka (JP); Takahiro Matsuda, Osaka (JP)

(73) Assignee: FUJIKIN INCORPORATED, Osaka-shi (JP)

( * ) Notice: Subject to any disclaimer, the term of this patent is extended or adjusted under 35 U.S.C. 154(b) by 73 days.

(21) Appl. No.: 15/112,269

(22) PCT Filed: Jan. 8, 2015

(86) PCT No.: PCT/JP2015/050340
§ 371 (c)(1),
(2) Date: Jul. 18, 2016

(87) PCT Pub. No.: WO2015/107971
PCT Pub. Date: Jul. 23, 2015

(65) Prior Publication Data
US 2016/0333917 A1 Nov. 17, 2016

(30) Foreign Application Priority Data

Jan. 20, 2014 (JP) ................................. 2014-007466

(51) Int. Cl.
*F16K 27/00* (2006.01)
*F16B 21/08* (2006.01)
*F16B 5/06* (2006.01)

(52) U.S. Cl.
CPC .......... *F16B 21/086* (2013.01); *F16B 5/0642* (2013.01); *F16K 27/00* (2013.01); *F16K 27/003* (2013.01)

(58) Field of Classification Search
CPC ...... F16B 21/086; F16B 5/0642; F16K 27/00; F16K 27/003; Y10T 137/87885
See application file for complete search history.

(56) References Cited

U.S. PATENT DOCUMENTS 2,836,215 A * 5/1958 Rapata .................... F16B 12/30
174/158 R
3,611,861 A * 10/1971 Schulze ................ F16B 21/082
411/508

(Continued)

FOREIGN PATENT DOCUMENTS

DE   19633058 A1 *  2/1998  ............. B25B 31/00
JP   60-028613 U    2/1985

(Continued)

OTHER PUBLICATIONS

International Search Report dated Feb. 10, 2015, issued for PCT/JP2015/050340.

(Continued)

*Primary Examiner* — Seth W Mackay-Smith
(74) *Attorney, Agent, or Firm* — Locke Lord LLP

(57) ABSTRACT

A fluid control apparatus having a fixing device is provided. A through hole of a lower level member includes a large diameter portion opening to an upper surface and a small diameter portion continuing from a lower side of the large diameter portion and opening to a lower surface. A fixing member includes a head portion that is to be inserted into the large diameter portion of the through hole of the lower level member, an upper shaft portion to be inserted into the small diameter portion of the through hole of the lower level member, and a lower shaft portion inserted at an upper end portion into a through hole of a supporting member. The lower shaft portion is provided with an engaging projection that engages a lower opening edge of the through hole of the (Continued)

supporting member and prevents the fixing member from dropping off the supporting member.

5 Claims, 6 Drawing Sheets

(56) References Cited

U.S. PATENT DOCUMENTS

| | | | | | |
|---|---|---|---|---|---|
| 3,693,494 | A | * | 9/1972 | Meyer | F16B 21/086 411/508 |
| 3,869,958 | A | * | 3/1975 | Murayama | F16B 21/076 411/15 |
| 3,893,208 | A | * | 7/1975 | Yuda | F16B 5/065 411/508 |
| 4,112,815 | A | * | 9/1978 | Tanaka | F16B 21/086 248/73 |
| 5,007,779 | A | * | 4/1991 | Goran | F16B 5/01 411/41 |
| 5,387,065 | A | * | 2/1995 | Sullivan | F16B 19/1081 411/45 |
| 5,724,709 | A | * | 3/1998 | Kittmann | F16B 21/086 24/297 |
| 5,979,944 | A | * | 11/1999 | Yokoyama | F15B 13/0817 285/124.3 |
| 6,765,148 | B2 | * | 7/2004 | Rix | F16B 5/0642 16/2.2 |
| 2005/0079033 | A1 | * | 4/2005 | Benedetti | F16B 21/086 411/508 |
| 2006/0000064 | A1 | * | 1/2006 | Leverger | F16B 5/0628 24/297 |
| 2008/0072405 | A1 | | 3/2008 | Horimatsu | |
| 2011/0014005 | A1 | * | 1/2011 | Shinozaki | F16B 5/0628 411/347 |
| 2014/0110936 | A1 | * | 4/2014 | Shinohara | F16B 5/0241 285/335 |

FOREIGN PATENT DOCUMENTS

| | | |
|---|---|---|
| JP | 11-094098 A | 4/1999 |
| JP | 11-182516 A | 7/1999 |
| JP | 2000-055021 A | 2/2000 |
| JP | 2005-027475 A | 1/2005 |
| JP | 2008-069824 A | 3/2008 |
| JP | 2010-019348 A | 1/2010 |
| JP | 2010-151179 A | 7/2010 |
| JP | 2013-217451 A | 10/2013 |
| KR | 10-1997-0045774 A | 7/1997 |
| KR | 10-1999-0029187 A | 4/1999 |
| WO | 2012/141939 A2 | 10/2012 |

OTHER PUBLICATIONS

Notification of Reason for Refusal dated Oct. 31, 2017, issued for the corresponding Korean patent application No. 10-2016-7012343 and English translation thereof.

* cited by examiner

FIXING DEVICE FOR LOWER LEVEL MEMBER AND FLUID CONTROL APPARATUS PROVIDED WITH THE SAME

TECHNICAL FIELD

The present invention relates to a fixing device that fixes a block joint (lower level member) disposed between a supporting member and a fluid control unit (upper level member) to the supporting member and is used in a fluid control apparatus that is assembled by fixing a plurality of joints (block joints) onto the supporting member and fixing the fluid control instrument so as to straddle these joints, and also to the fluid control apparatus provided with the fixing device.

Background Art

PTL 1 discloses a fixing device for a lower level member and a fluid control apparatus as illustrated in FIG. 8, which are objects of the present invention.

A fluid control apparatus (1) is used in, for example, a semiconductor manufacturing apparatus and includes: a plurality of block joints (lower level members) (2), (3) each having a fluid channel opening upward; a plurality of fluid control instrument (upper level members) (4), (5), (6), (7) each having a fluid channel communicating with each of the fluid channels of the block joints (2), (3) and opening downward; a plurality of sealing portions (not illustrated) interposed at mating surfaces between the fluid channels of the block joints (2), (3) and fluid channels provided in main bodies (4a), (5a), (6a), (7a) of fluid control instrument (4), (5), (6), (7); a supporting member (51) that supports a plurality of block joints (2), (3); a plurality of joint member fixing bolts (52) that mount the block joints (2), (3) on the supporting member (51); and a plurality of fluid control apparatus fixing bolts (8) that mount the fluid control instrument (4), (5), (6), (7) on the block joints (2), (3) respectively.

The block joints (2), (3) each include a through hole (11) that allows insertion of the bolt. A cylindrical spacer (12) is fitted in the through hole (11), and an annular elastic member (13) that biases each of the block joints (2), (3) downward (toward the supporting member (51)) on a lower surface of a flange is provided at an upper end portion of the spacer (12).

A Fixing device (9) for a lower level member is a device that fixes each of the block joint (2), (3) (that is, the lower level members (2), (3) each having the through hole (11)) that are disposed between the supporting member (51) and each of the upper level members (4), (5), (6), (7) to the supporting member (51), and includes a screw hole (51a) provided on the supporting member (51), the bolt (52), the spacer (12), and the elastic member (13).

CITATION LIST

Patent Literatures

PTL 1 JP-A-11-94098

SUMMARY OF THE INVENTION

Technical Problem

The fixing device for a lower level member described in PTL 1 configured to fix by using the bolt (the joint fixing bolt (52)) has problems that a tool for fastening the bolt is required, and a significant labor is required for fastening the bolt.

It is an object of the present invention to provide a fixing device for a lower level member that requires no tool for fixation and that reduces a labor of fixation, and a fluid control apparatus provided with such a fixing device.

Solution to Problem

A fixing device for a lower level member according to the present invention is a device that fixes a lower level member provided with a through hole to a supporting member with a fixing member, characterized in that the supporting member is provided with the through hole that allows insertion of the fixing member, the through hole of the lower level member includes: a large diameter portion opening to an upper surface; and a small diameter portion continuing from a lower side of the large diameter portion and opening to a lower surface, the fixing member includes: a head portion that is to be inserted into the large diameter portion of the through hole of the lower level member; an upper shaft portion that is to be inserted into the small diameter portion of the through hole of the lower level member; and a lower shaft portion that is to be inserted at an upper end portion thereof into the through hole of the supporting member, and the lower shaft portion is provided with an engaging projection that engages a lower opening edge of the through hole of the supporting member and prevents the fixing member from dropping off the supporting member.

The fixing member may be inserted into the through hole of the supporting member after the fixing member has been mounted on the lower level member, or may be inserted into both of the through hole of the lower level member and the through hole of the supporting member in a state in which the lower level member and the supporting member are aligned to each other. The former configuration is more preferable.

In a state in which the fixing member is inserted into the lower level member, part of the lower shaft portion except for the upper end portion projects downward from the lower surface of the lower level member, and the projecting part of the lower shaft portion is inserted into the through hole of the supporting member from above. At this time, the engaging projection provided on the lower shaft portion is forcedly passed through the through hole of the supporting member. Accordingly, the engaging projection engages the lower opening edge of the through hole of the supporting member, and an upward movement of the fixing member with respect to the supporting member is prevented. At this time, the head portion of the fixing member prevents an upward movement of the lower level member, and prevents separation of the lower level member from the supporting member. In other words, the lower level member can be fixed to the supporting member without using a bolt. Therefore, a fixing tool such as a wrench is not necessary, and a labor of fixation may be reduced.

Preferably, the lower shaft portion includes a solid section, and folded sections extending upward from a lower end of the solid section, and upper ends of the folded sections are inserted into the through hole of the supporting member, and the engaging projections are provided on outer peripheral surfaces of the folded sections.

The number of the folded sections is, for example, two (a pair). However, the number of the folded sections is not limited thereto, and a plurality of the folded sections may be formed around the solid section. The engaging projections may be formed on all of the folded sections. However, the engaging projections may be formed only on one of pairs of the folded sections. Furthermore, in the case where the engaging projections are formed on the plurality of folded sections, the engaging projections may be disposed at different positions on each pair of the folded sections. In this configuration, any one of the plurality of engaging projections may engage the lower opening edge of the through hole for the supporting members having different thickness, the range of application may be extended.

The folded sections elastically deform easily, and a configuration of the folded sections having the engaging projections facilitates an operation to forcedly pass the engaging projections through the through hole of the supporting member. Here, if the degree of deformation of the folded sections increases, a stress concentrates on roots of the folded sections, and breakage may occur. However, the folded sections provided so as to oppose side surfaces of the solid section at a predetermined distance come into abutment with the side surfaces of the solid section at the time of deformation, whereby increase in degree of deformation of the folded sections is prevented.

The fixing member may be formed into an integral part (the head portion, the upper shaft portion, and the lower shaft portion are formed integrally), and may be an assembled part including two or more parts (the lower shaft portion is replaceably attached to the upper shaft portion). The fixing member may be formed of a synthetic resin and may be formed of a metal.

The fixing device for a lower level member may further be provided with a cylindrical spacer that is to be inserted into the small diameter portion of the through hole. The fixing device for a lower level member may further be provided with an annular elastic member that biases the lower level member downward.

The cylindrical spacer and the annular elastic member are members that have been used in the related art, and hence the positioning (correction of parallelism) of the lower level members is facilitated by using these members of the related art.

Preferably, the elastic member deforms to allow an upward movement of the lower level member, and has an annular shape formed of rubber or a synthetic resin. The elastic member facilitates a levelling operation for aligning the upper surfaces of the lower level members into flush with each other, and absorbs vibrations by elastic deformation of the elastic member.

The spacer may be formed without a flange (cylindrical shape), and may have a flange at an upper end thereof. An elastic body is disposed at a lower surface of the head portion of the fixing member and a step (a step formed at a boundary area between the large diameter portion and the small diameter portion) if the spacer is not provided with a flange, and the elastic body is disposed between the lower surface of the flange of the spacer and the step if the spacer is provided with the flange. The latter configuration is more preferable.

Preferably, the head portion and the upper shaft portion both have a cylindrical shape, the upper shaft portion includes a flange portion having a diameter larger than that of a through hole of the supporting member at a lower end thereof, and the head portion and the upper shaft portion are provided with at least one slit that allows an outer diameter of the head portion to be reduced.

In other words, the outer diameters of the upper and lower shaft portions may be smaller than the diameter of the small diameter portion of the through hole of the lower level member to allow the fixing member to be inserted into the through hole from the upper side of the lower level member. However, in this configuration, the diameter of the lower shaft portion provided with the engaging projection needs to be reduced and thus the strength may be deteriorated. Therefore, preferably, the outer diameters of the upper and lower shaft portions are set to be larger than the diameter of the through hole of the supporting member to allow the fixing member to be inserted into the through hole from the lower side of the lower level member. In this configuration, fixing member is prevented from being pulled out upward from the lower level member and the engaging projection may be formed without being limited by the diameter of the small diameter portion of the through hole of the lower level member, which is advantageous in terms of ensuring durability.

In order to insert the fixing member from the lower side of the lower level member into the through hole, the head portion needs to be inserted into the small diameter portion of the through hole. In order to enable the insertion, both of the head portion and the upper shaft portion are formed into a cylindrical shape, and the head portion and the upper shaft portion are provided with at least one slit. Preferably, a plurality of the slits are provided from the upper surface of the head portion to a position near the lower end of the shaft portion and disposed in the circumferential direction. The flange portion prevents the upper shaft portion provided with the slits from separating and achieves positioning of the fixing member with respect to the supporting member by coming into abutment with edge of the through hole of the supporting member on an upper surface side from above.

A fluid control apparatus of the present invention including:

a plurality of block joints each provided with a fluid channel opening upward; a plurality of fluid control instrument each having a fluid channel communicating with the fluid channel of each of the block joints and opening downward; a plurality of seal portions interposed on mating surface between each of the fluid channels of the block joints and each of the fluid channels of the fluid control instrument, a supporting member that supports a plurality of block joints, and a plurality of bolts that mount the fluid control instrument to the block joints, respectively, wherein the block joints correspond to lower level members, and the block joints are mounted on the supporting member by fixing devices for the lower level members described above.

All of the plurality of block joints may be mounted on the supporting member by the fixing devices for a lower level member, and some of the plurality of block joints may be mounted on the supporting member by using the fixing devices for a lower level member. In the latter case, the rest of the plurality of block joints are mounted, for example, by using the fixing devices for a lower level member in which a bolt is employed.

In this specification, the upper and lower means the upper and the lower in FIG. 8. However, the terms upper and lower are used for the sake of convenience, and the fixing device and the fluid control apparatus may be installed on a horizontal plane in an illustrated state or may be installed on a vertical plane.

Advantageous Effects of Invention

According to the fixing device for a lower level member of the present invention, the engaging projection engaging the lower opening edge of the through hole of the supporting member prevents an upward movement of the fixing member with respect to the supporting member, prevents an upward movement of the lower level member by the head portion of the fixing member, and prevents the lower level member from separating from the supporting member. In other words, the lower level member can be fixed to the supporting member without using a bolt. Therefore, a fixing tool such as a wrench is not necessary, and a labor of fixation may be reduced.

Figure 1:
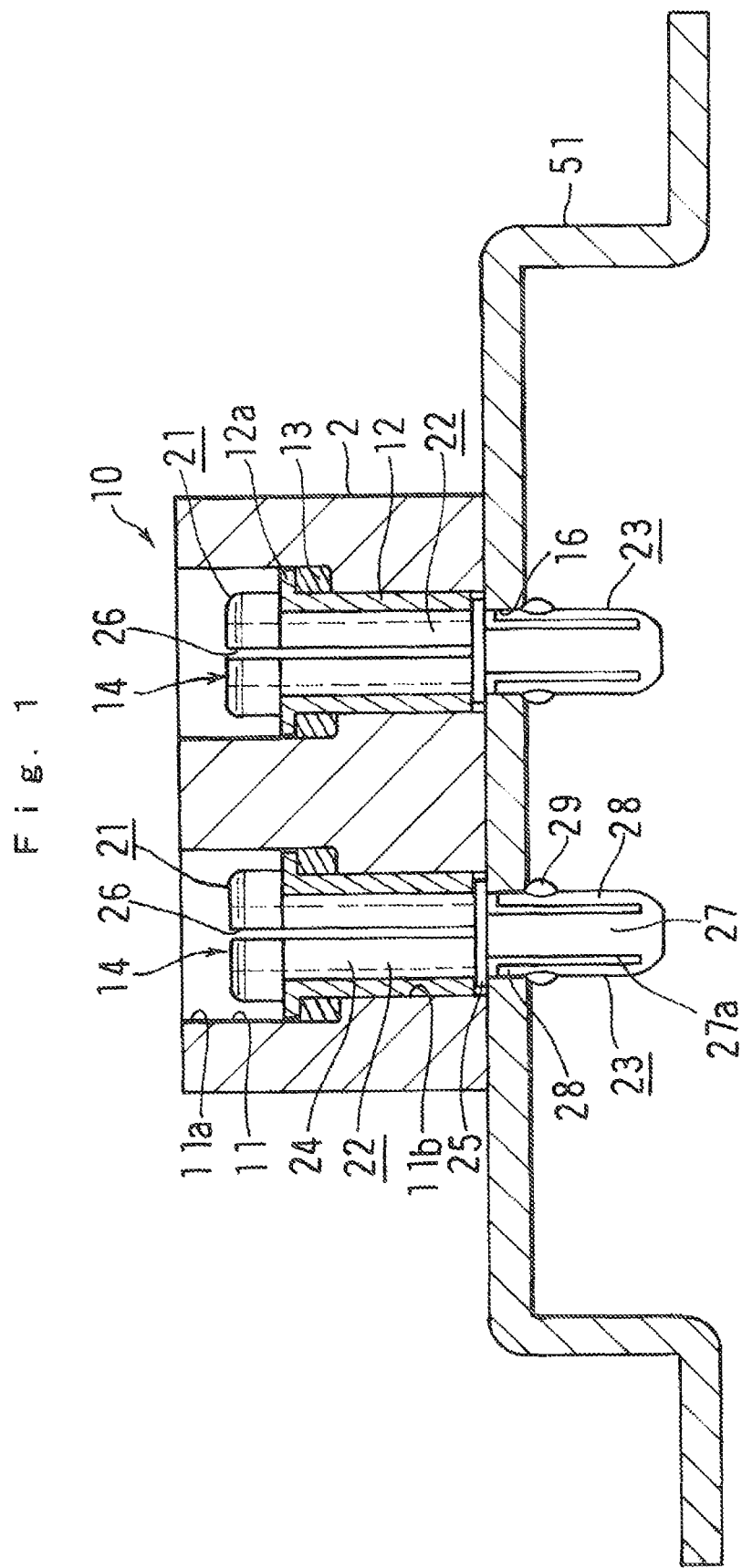
FIG. 1 is a cross sectional view illustrating a first embodiment of a fixing device for a lower level member according to the present invention.

REFERENCE SIGNS LIST (2) (3): block joint (lower level member) (4) (5) (6) (7): fluid control instrument (upper level member) (11) through hole (11a): large diameter portion (11b): small diameter portion (12): spacer (13): elastic member (14): fixing member (15): fixing member (16): through hole (21): head portion (22) upper shaft portion (23) lower shaft portion (25): flange portion (26): slit (27): solid section (27a): side surface (28): folded section (29): engaging projection (51): supporting member

DETAIL DESCRIPTION OF INVENTION

Embodiments of the invention will be described below with reference to the drawings. In the following description, expressions upper and lower correspond to upper and lower of FIG. 1.

FIG. 1 to FIG. 6 illustrate a first embodiment of a fixing device for a lower level member of the present invention.

A fixing device (10) for the lower level member is a device that fixes a lower level member (2) to a supporting member (51) with a fixing member (14) and is modified from a fluid control apparatus (1) illustrated in FIG. 8 in that a bolt (52) is replaced by the fixing member (14) described later. The supporting member (51), a spacer (12), and an elastic member (13) may be the same members as those illustrated in FIG. 8, and may also be modified slightly from those illustrated in FIG. 8 as needed.

Figure 8:
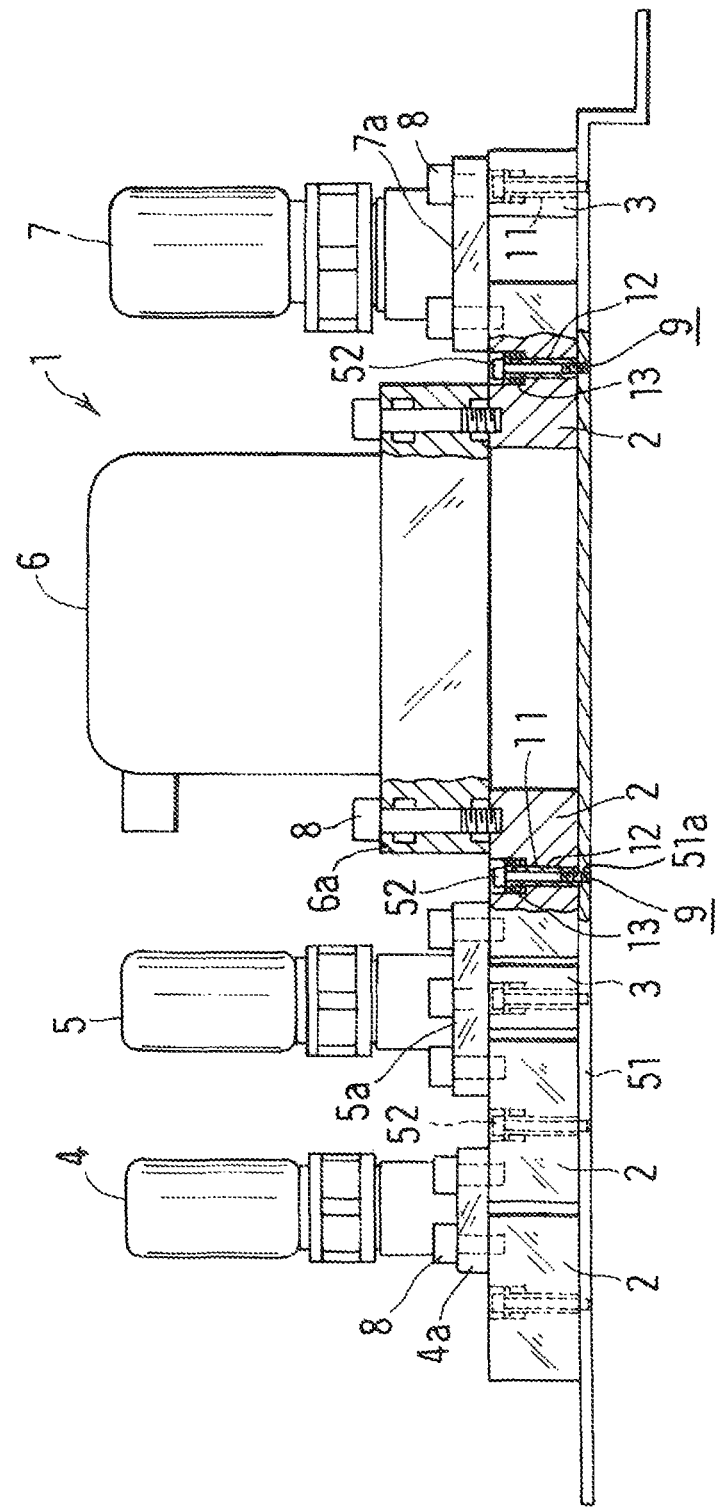
FIG. 8 is a side view of a fixing device for a lower level member and a fluid control apparatus of the related art having the fixing device partly broken.

The lower level member (2) is the same member as the block joint (2) illustrated in FIG. 8, and has through holes (11) in which the bolt (52) is used to be inserted. The through hole (11) includes a large diameter portion (11a) opening to an upper surface and a small diameter portion (11b) continuing from a lower side of the large diameter portion (11a) and opening to a lower surface.

Figure 2:
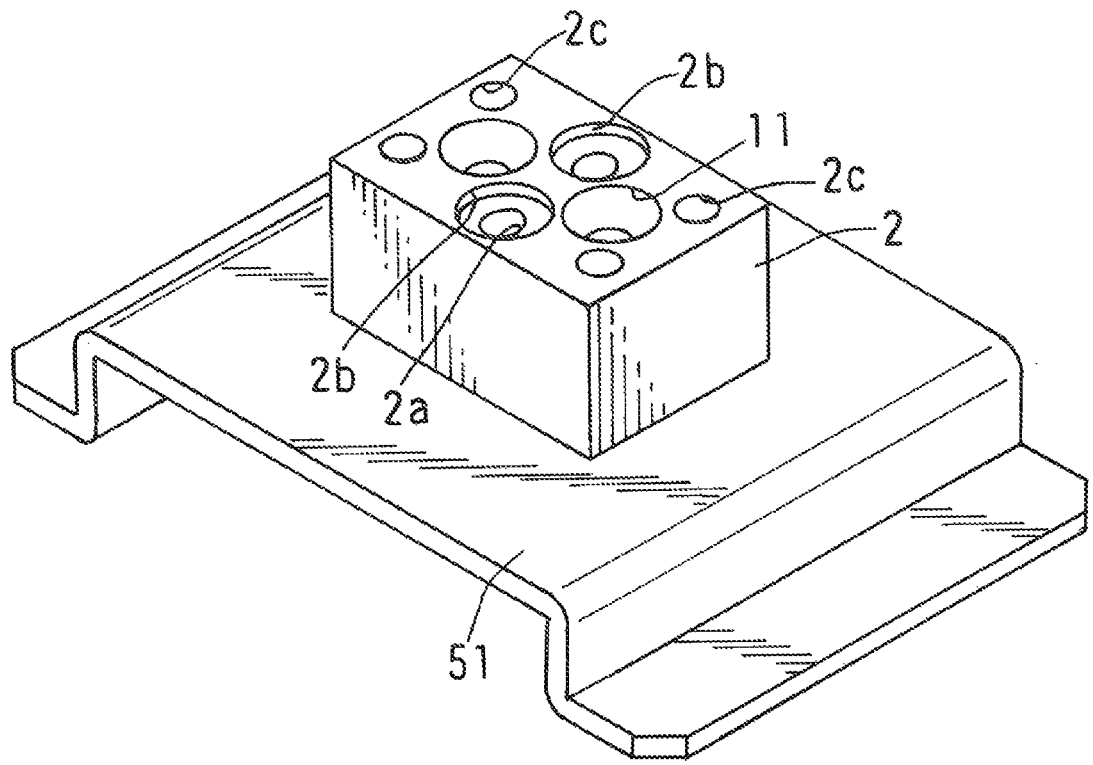
FIG. 2 is a perspective view illustrating a supporting member and the lower level member.
Figure 3:
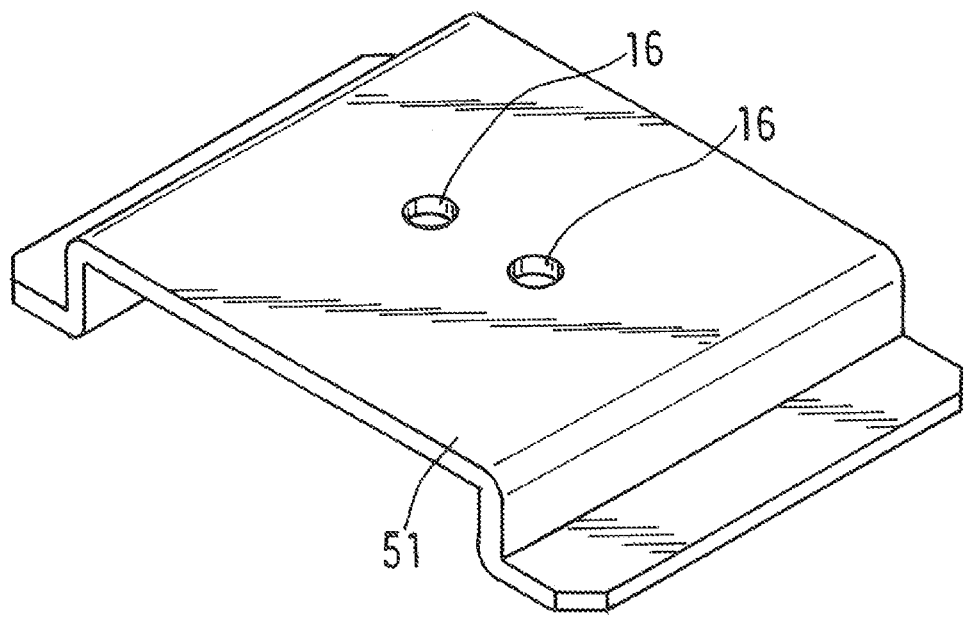
FIG. 3 is a perspective view illustrating the supporting member.

The lower level member (block joint) (2) further includes a V-shaped fluid channel (2a) having two openings opening upward as illustrated in FIG. 2, a seal member storage recess (2b) provided at each of opening edges of the fluid channel (2a), and female screw portions (2c) that are engaged with fluid control apparatus fixing bolts ((8) in FIG. 8). In FIG. 1, illustration of the fluid channel (2a) is omitted.

The supporting member (51) has a coated steel plate having a thickness of approximately 2 mm. The supporting member (51) is provided with through holes (16) as illustrated also in FIG. 3. A screw hole (51a) illustrated in FIG. 8 may be used as-is as the through hole (16), or a simple through hole having a circular cross section may be used because it does not have to be the screw hole (51a).

The cylindrical spacer (12) having a flange (12a) is fitted to the small diameter portion (11b) of each of the through hole (11) of the lower level member (2). The spacer (12) has a lower end received by the supporting member (51), and an upper end located within the large diameter portion (11a) and receiving a head portion (21) of the fixing member (14). The annular elastic member (13) that biases the lower level member (2) downward (toward the supporting member (51)) is interposed between the lower surface of the flange (12a) of the spacer (12) and a bottom surface of the large diameter portion (11a) of the through hole (11) (a step formed at a boundary area between the large diameter portion (11a) and the small diameter portion (11b)) of the large diameter portion (11a) of the through hole (11). The spacer (12) may be omitted, or the elastic member (13) may be interposed between the lower surface of the head portion (21) of the fixing member (14) and the bottom surface of the large diameter portion (11a) of the through hole (11) while eliminating the flange (12a).

The elastic member (13) is an annular member formed of rubber or a synthetic resin. The elastic member (13) may be provided with notches at upper and lower portion of the outer peripheral surface.

Figure 4:
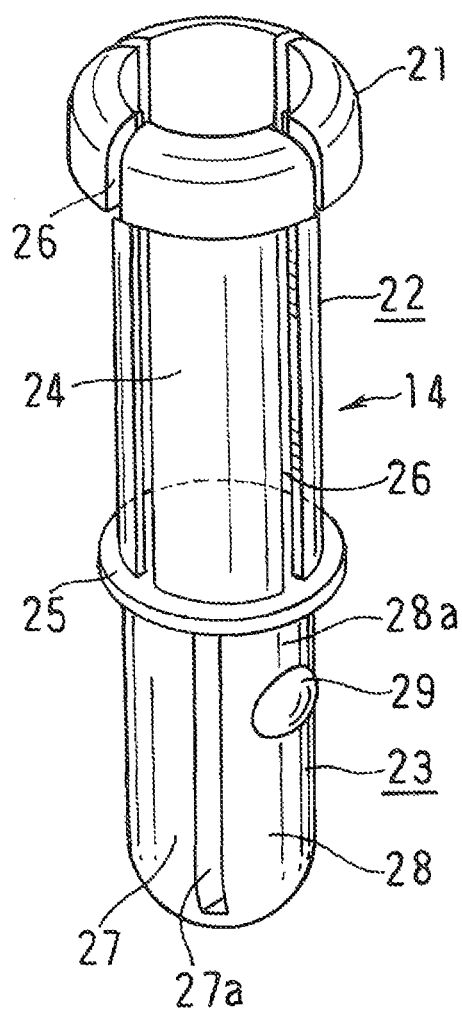
FIG. 4 is a perspective view illustrating a fixing member.
Figure 5:
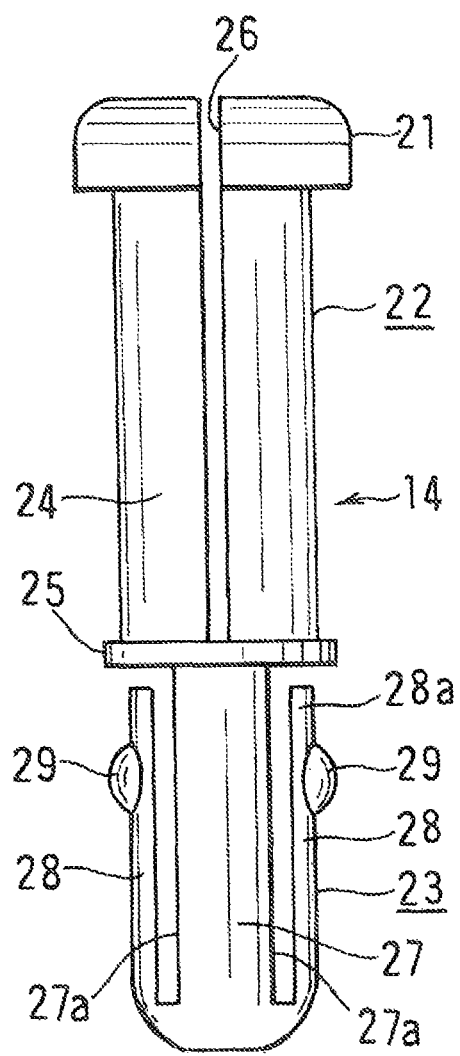
FIG. 5 is a front view illustrating the fixing member.
Figure 6:
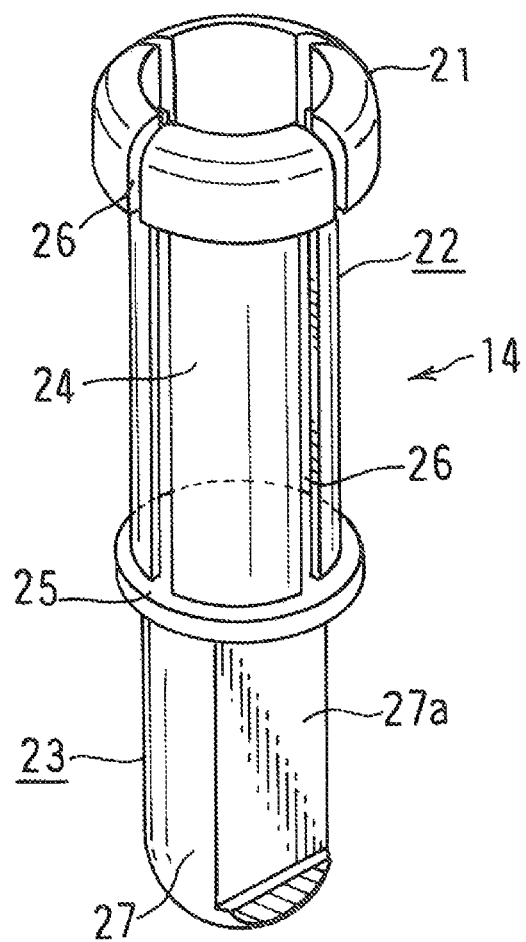
FIG. 6 is a perspective view illustrating the fixing member with a folded sections removed therefrom.

As illustrated in FIG. 4 to FIG. 6, the fixing member (14) includes the head portion (21) that is to be inserted into the large diameter portion (11a) of the through hole (11), an upper shaft portion (22) to be inserted into the small diameter portion (11b) of the through hole (11), and a lower shaft portion (23) continuing from a lower end of the upper shaft portion (22).

The head portion (21), the upper shaft portion (22) and the lower shaft portion (23) are formed integrally as a synthetic resin molding. The fixing member (14) may be formed of a metal. Instead of forming all of the head portion (21), the upper shaft portion (22), and the lower shaft portion (23) integrally, the head portion (21) and the upper shaft portion (22) may be formed separately from the lower shaft portion (23) so that the lower shaft portion (23) is allowed to be replaceably attached to the upper shaft portion (22) which is integrally formed with the head portion (21).

The head portion (21) is formed into a cylindrical shape having a relatively short in length and large in diameter, and the upper shaft portion (22) is formed into a cylindrical shape having a relatively long in length and small in diameter.

The upper shaft portion (22) includes a cylindrical portion (24) and a disc-shaped flange portion (25) provided at a lower end thereof.

The length of the upper shaft portion (22) is determined so that the lower surface of the flange portion (25) comes into abutment with the upper surface of the supporting member (51) in a state in which the lower surface of the head portion (21) is received by the bottom surface of the large diameter portion (11a) of the through hole (11).

The head portion (21) and the upper shaft portion (22) are provided with four slits (26) extending from an upper surface of the head portion (21) in an axial direction in parallel to each other at regular intervals in a circumferential direction. Each slit (26) is provided so as to reach the upper surface of the flange portion (25), whereby the outer diameter of the head portion (21) may be reduced by reducing the outer diameter of the upper shaft portion (22).

The diameter of the flange portion (25) of the upper shaft portion (22) is larger than the diameter of the through holes (16) of the supporting member (51). The flange portion (25) prevents the upper shaft portion (22) provided with the slits (26) from separating and achieves positioning of the fixing member (14) with respect to the supporting member (51) by coming into abutment with edge of the through holes (16) of the supporting member (51) on an upper surface side from above. The diameter of the flange portion (25) is a size between the inner diameter and the outer diameter of the spacer (12).

The lower shaft portion (23) includes a solid section (27) having a pair of flat side surfaces (27a) and a pair of folded sections (28) extending upward from a lower end of the solid section (27) so as to oppose the flat side surfaces (27a) respectively at a predetermined distance.

With distances provided between the folded sections (28) and the flat side surfaces (27a) of the solid section (27) respectively, the folded sections (28) are deformable radially inward until they come into abutment with the side surface (27a) of the solid section (27), and are prevented from deforming further by the abutment with the side surfaces (27a) of the solid section (27).

Outer peripheral surfaces that connect the flat side surfaces (27a) of the solid section (27) and the outer peripheral surfaces of the pair of folded sections (28) form a substantially cylindrical outer peripheral surface, and the diameter of this outer peripheral surface (the diameter of the lower shaft portion (23)) is the same as the diameter of the through hole (16) of the supporting member (51).

Upper end portions of the folded sections (28) are inserted into the through hole (16) of the supporting member (51) and the folded sections (28) each include a semispherical engaging projection (29) that engages the lower opening edge of the through hole (16) of the supporting member (51) and prevents an upward movement of the fixing member (14).

In FIG. 1, the fixing member (14) fixes the spacer (12) to the supporting member (51), and the fixing member (14) and the spacer (12) are immovable with respect to the supporting member (51). The lower level member (2) receives a downward force from the spacer (12) via the elastic member (13), so that the lower surface thereof comes into abutment with the supporting member (51) and thus becomes immovable. The elasticity of the rubber-made elastic member (13) is smaller than a force applied by a hand. Therefore, the lower level member (2) may be lifted upward by hand by applying an upward force to the lower level member (2) against the elasticity. Accordingly, in a case where the upper surface of the lower level member (2) is lower, the position of the upper surface of the lower level member (2) can be fine-adjusted, that is, levelling can be performed by moving the lower level member (2) upward against the elasticity of the elastic member (13).

In order to fix the lower level member (2) to the supporting member (51) by the fixing member (14) as illustrated in FIG. 1, the head portion (21) and the upper shaft portion (22) of the fixing member (14) are firstly inserted into the through hole (11) of the lower level member (2), and then the lower shaft portion (23) of the fixing member (14) is inserted into the through hole (16) of the supporting member (51).

The diameter of the flange portion (25) is determined to be larger than the diameter of the through hole (16) of the supporting member (51), and is determined to be larger than the inner diameter of the spacer (12). Therefore, the fixing member (14) cannot be inserted into the lower level member (2) from above, and is inserted into the lower level member (2) from below in a state in which the supporting member (51) is not present. Since the diameter of the head portion (21) here is larger than the inner diameter of the spacer (12), the head portion (21) cannot be inserted as-is into the through hole (11). However, the provision of the slits (26) enables a reduction in diameter of the upper shaft portion (22) so as to reduce the width of the slits (26), and thus enables a reduction in diameter of the head portion (21). The width of the slits (26) is determined to allow the head portion (21) to be inserted into the spacer (12), and the reduction in diameter of the head portion (21) allows insertion of the fixing member (14) into the through hole (11) from below. When the flange portion (25) is inserted into a lower end portion of the small diameter portion (11b) of the through hole (11), an operation to insert the fixing member (14) into the lower level member (2) is stopped. At this point, the head portion (21) is restored to its original size in the large diameter portion (11a), whereby the fixing member (14) is inserted into the through hole (11) with the lower shaft portion (23) projected downward.

Subsequently, the lower shaft portion (23) of the fixing member (14) is inserted into the through holes (16) of the supporting member (51) from above to allow the engaging projection (29) to pass through the through hole (16). Accordingly, abutment of the flange portion (25) of the upper shaft portion (22) with the supporting member (51) from the upper surface side and abutment of the engaging projection (29) with the supporting member (51) from the lower surface side allow insertion of the fixing member (14) into the through holes (16) of supporting member (51) in a state of being immovable neither upward nor downward. Accordingly, retention of the fixing member (14) in the supporting member (51) and retention of the lower level member (2) in the supporting member (51) are simultaneously achieved.

The folded sections (28) is prevented from being further deformed by the presence of the flat side surfaces (27a) of the solid section (27) when the fixing member (14) is inserted into the through holes (16). Therefore, an application of a force stronger than a predetermined value between the folded sections (28) and the lower end portion of the solid section (27) is prevented, so that a configuration having high durability is achieved.

The semispherical shape of the engaging projection (29) enables insertion of the lower shaft portion (23) of the fixing member (14) into the through hole (16) of the supporting member (51) not only from an upper side to the lower side, but also from the lower side to the upper side. Therefore, in FIG. 1, the fixing member (14) being allowed to be pulled out from the supporting member (51) in a state of being attached to the lower level member (2) by lifting the lower level member (2) upward is advantageous when the lower level member (2) is required to be removed from the supporting member (51) under a circumstance in which the fixing member (14) cannot be removed by pushing from the lower side. The shape of the engaging projection (29) is not limited to a semispherical shape.

In this manner, the fixing device (10) for a lower level member of this embodiment enables fixation of the lower level member (2) to the supporting member (51) without using a bolt. Insertion of the fixing member (14) into the through hole (11) does not require a tool such as a wrench, and thus a labor of fixation to a fixing device for a lower level member of the related art, which uses bolts, is significantly reduced.

The fixing device (10) for a lower level member illustrated from FIG. 1 to FIG. 6 may be applied for fixation of all of the block joints (2), (3) of the fluid control apparatus (1) illustrated in FIG. 8 as a matter of course. However, some of the block joints (2), (3) may be fixed by the fixing device for the lower level member, in which the bolt (52) of the related art is employed, and the rest may be fixed by using the fixing device (10) for a lower level member of the present invention.

The spacer (12), which is used in the fixing device (10) for the lower level member of the first embodiment described above, may be omitted. An embodiment will be illustrated in FIG. 7.

Figure 7:
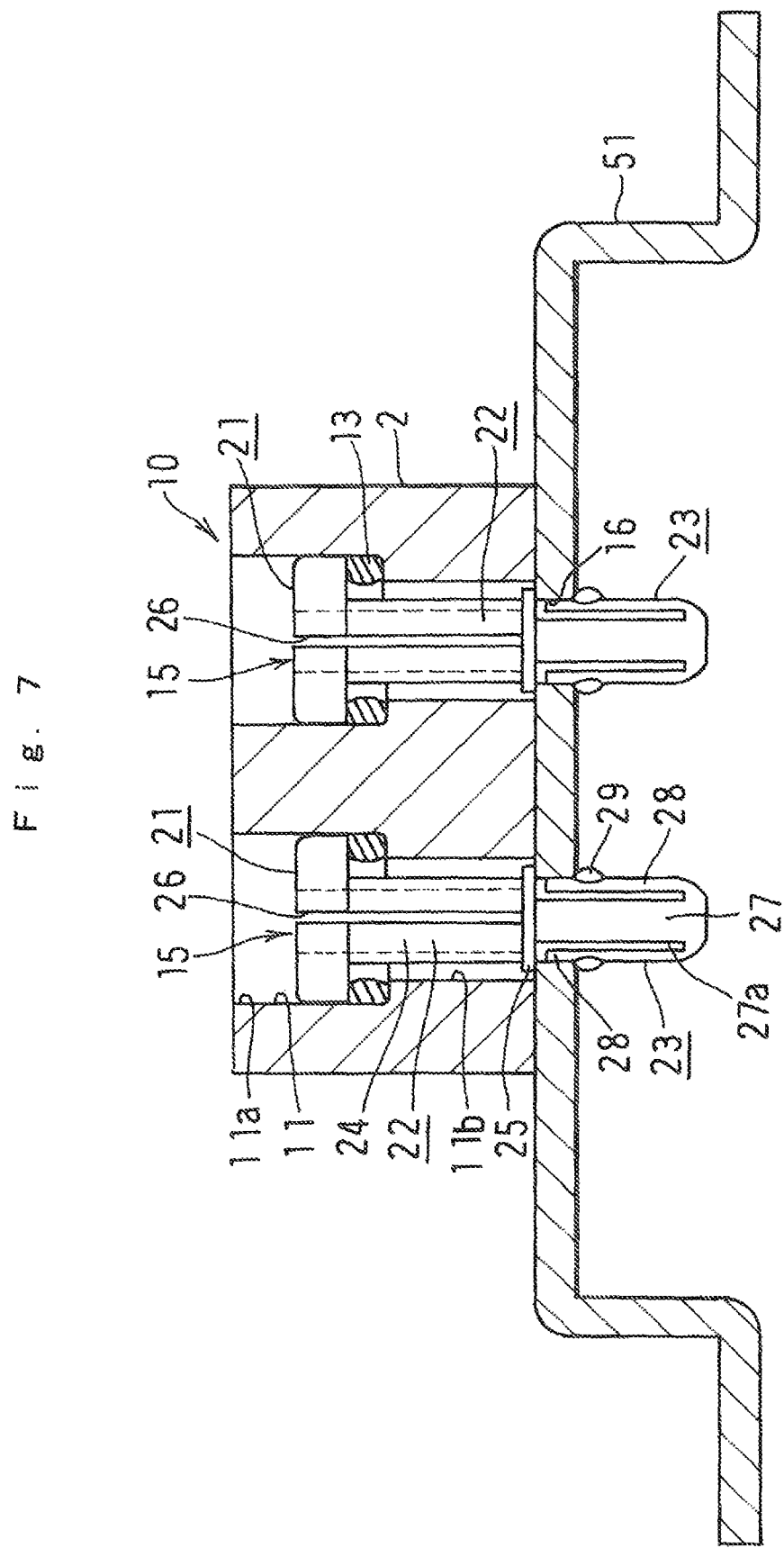
FIG. 7 is a cross sectional view illustrating a second embodiment of a fixing device for a lower level member according to the present invention.

The fixing device (10) for a lower level member according to a second embodiment illustrated in FIG. 7 excludes the spacer (12) from the fixing device (10) for a lower level member of the first embodiment, and includes a fixing member (15) having a modified shape accordingly.

In the same manner as the fixing member of the first embodiment, the fixing member (15) includes the head portion (21) that is to be inserted into the large diameter portion (11a) of the through hole (11), the upper shaft portion (22) to be inserted into the small diameter portion (11b) of the through hole (11), and the lower shaft portion (23) continuing from the lower end of the upper shaft portion (22).

The fixing member (15) includes the head portion (21) and the upper shaft portion (22) having different shapes from those of the first embodiment, and includes the lower shaft portion (23) having the same shape as that of the first embodiment.

Different points are the length of the upper shaft portion (22) in the axial direction, which is reduced by a length corresponding to the thickness of the flange (12a) of the spacer (12), and the diameter of the head portion (21), which is increased to a diameter substantially the same as the diameter of the flange (12a) of the spacer (12).

The fixing device (10) for a lower level member of the second embodiment illustrated in FIG. 7 achieves the same advantageous effects as those of the first embodiment although the spacer (12) is omitted from the fixing device (10) for a lower level member according to the first embodiment illustrated in FIG. 1 to FIG. 6.

When the spacer (12) is omitted, the diameter of the head portion (21) may be large as that illustrated in FIG. 7 and the through holes (16) of the supporting member (51) may be determined to have the same diameter as the through hole (11) of the lower level member (2) to allow the upper shaft portion (22) and the lower shaft portion (23) to have diameters larger than those illustrated in FIG. 7 so as to be fitted into the through holes (16), (11).

INDUSTRIAL APPLICABILITY

The fixing device for a lower level member of the invention allows the lower level member to be fixed to the supporting member without using a bolt, and thus eliminates the needs for tools for fixation and reduces a labor of fixation. Therefore, a labor for installing the fluid control apparatus provided with the fixing device is reduced.

The invention claimed is:

1. A fixing device for a lower level member that fixes the lower level member provided with a through hole to a supporting member with a fixing member, wherein
the supporting member is provided with a second through hole that allows insertion of the fixing member,
the through hole of the lower level member includes: a large diameter portion opening to an upper surface; and a small diameter portion continuing from a lower side of the large diameter portion and opening to a lower surface,
the fixing member includes: a head portion that is to be inserted into the large diameter portion of the through hole of the lower level member; an upper shaft portion that is to be inserted into the small diameter portion of the through hole of the lower level member; and a lower shaft portion that is to be inserted at an upper end portion thereof into the second through hole of the supporting member, and
the lower shaft portion is provided with an engaging projection that engages a lower opening edge of the second through hole of the supporting member and prevents the fixing member from dropping off the supporting member,
wherein
the head portion and the upper shaft portion both have a cylindrical shape, the upper shaft portion includes a flange portion having a diameter larger than that of the second through hole of the supporting member at a lower end thereof, and the head portion and the upper shaft portion are provided with a slit that allows an outer diameter of the head portion to be reduced,
the upper shaft portion of the fixing member is configured to be inserted into the through hole of the lower level member from a lower side of the lower level member,
the lower shaft portion is configured to be projected downward in the state the fixing member is inserted in the lower level member,
the lower shaft portion of the fixing member is configured to be inserted into the second through hole of the supporting member from above, and
the diameter of the flange portion is smaller than that of the small diameter portion of the through hole of the lower level member.

2. The fixing device for a lower level member according to claim 1, wherein the lower shaft portion includes a solid section, and a folded section extending upward from a lower end of the solid section, and an upper end of the folded section is inserted into the second through hole of the supporting member, and the engaging projection is provided on an outer peripheral surface of the folded section.

3. The fixing device for a lower level member according to claim 1, wherein the head portion, the upper shaft portion, and the lower shaft portion are formed integrally.

4. The fixing device for a lower level member according to claim 1, wherein the lower shaft portion is replaceably attached to the upper shaft portion.

5. A fluid control apparatus comprising: a plurality of block joints each provided with a fluid channel opening upward; a plurality of fluid control instruments each having a fluid channel communicating with the fluid channels of each of the block joints and opening downward; a plurality of seal portions interposed on a mating surface between each of the fluid channels of the block joints and each of the fluid channels of the fluid control instruments, a supporting member that supports a plurality of block joints, and a plurality of bolts that mount the fluid control instruments to the block joints respectively, wherein the block joints correspond to a lower level members, and the block joints are mounted on the supporting member by the fixing devices for a lower level member according to claim 1.

\* \* \* \* \*